US012674430B2

(12) United States Patent
Weber et al.

(10) Patent No.: US 12,674,430 B2
(45) Date of Patent: Jul. 7, 2026

(54) SYSTEM FOR CONTROLLING PRODUCTION OF OZONE FOR AN INTERNAL COMBUSTION ENGINE

(71) Applicant: OXITRON TECHNOLOGIES LLC, Branford, CT (US)

(72) Inventors: Charles E. Weber, Branford, CT (US); George Mismas, Cheshire, CT (US); Thomas Ciesco, Northford, CT (US)

(73) Assignee: Oxitron Technologies LLC, Branford, CT (US)

(*) Notice: Subject to any disclaimer, the term of this patent is extended or adjusted under 35 U.S.C. 154(b) by 0 days.

(21) Appl. No.: 18/931,898

(22) Filed: Oct. 30, 2024

(65) Prior Publication Data

US 2025/0270973 A1 Aug. 28, 2025

Related U.S. Application Data

(63) Continuation-in-part of application No. 18/587,001, filed on Feb. 26, 2024, now Pat. No. 12,158,125.

(51) Int. Cl.
*F02M 25/12* (2006.01)
*C01B 13/10* (2006.01)
(52) U.S. Cl.
CPC ............. *F02M 25/12* (2013.01); *C01B 13/10* (2013.01)

(58) Field of Classification Search
CPC ................................. F02M 25/12; C01B 13/10
USPC ................ 123/585, 536, 539, 542, 549, 556
See application file for complete search history.

(56) References Cited

U.S. PATENT DOCUMENTS

| | | | |
|---|---|---|---|
| 7,341,049 B2 | 3/2008 | Clack | |
| 8,205,600 B2 | 6/2012 | Hammer | |
| 9,029,797 B2 | 5/2015 | Denning et al. | |
| 9,850,828 B2 | 12/2017 | Nagatsu et al. | |
| 2005/0126550 A1 | 6/2005 | Varasundharosoth et al. | |
| 2007/0012300 A1 | 1/2007 | Clack | |
| 2009/0095266 A1 | 4/2009 | Burmenko | |
| 2009/0120415 A1 | 5/2009 | Clack | |

*Primary Examiner* — Hai H Huynh
(74) *Attorney, Agent, or Firm* — DeLio Peterson & Curcio LLC; Robert Curcio

(57) ABSTRACT

A method of using ozone for maintaining an internal combustion engine. The method includes providing a maintenance system including a user control panel, an ozone generator, a blower, the blower having a first blower end for intake of air and a second blower end connected to the ozone generator and a safety module with at least one safety sensor connected thereto. The maintenance system includes a control module connected to the ozone generator and to the safety module. The system includes an ozone transport tube having a first tube end sealable to the internal combustion engine. The method includes connecting the ozone transport tube to an air intake of the internal combustion engine and directing the ozone through the ozone transport tube during operation of the internal combustion engine. The method includes allowing the ozone to react with deposits in the internal combustion engine.

14 Claims, 15 Drawing Sheets

600

700

800

SYSTEM FOR CONTROLLING PRODUCTION OF OZONE FOR AN INTERNAL COMBUSTION ENGINE

COPYRIGHT

REFERENCE TO RELATED APPLICATIONS

This application is a Non-Provisional Utility Patent application claiming priority to U.S. patent application Ser. No. 18/587,001, filed on Feb. 26, 2024, the application of which is incorporated by reference herein in its entirety.

BACKGROUND OF THE INVENTION

1. Field of the Invention

The invention relates in general to the field of internal combustion engine maintenance, and more particularly to a system which produces and controls ozone for removal of deposits injected into the fuel or air path of an internal combustion engine, which is used to improve the performance efficiency and emissions of that internal combustion engine.

DESCRIPTION OF RELATED ART

Since the development of the internal combustion engine there has always been a desire to improve performance by improving the miles per gallon achieved when such engines are used in moving vehicles such as trucks, buses and automobiles. More recently there has been a desire to maintain a more complete combustion in the internal combustion engine, especially in a diesel fuel engine, and eliminate unhealthy emissions such as non-combusted fuel and fuel particles, carbon monoxide, nitrogen oxides, and ozone.

Engine carbon deposits have a measurable effect on performance, emissions, and fuel economy. Carbon deposits have been a problem for the internal combustion engine since it was invented. It is well known that carbon deposits in internal combustion engines reduce engine performance, reduce fuel efficiency, shorten engine/equipment/parts life, and increase engine out emissions.

There is a need for a system to maintain low carbon deposits during operational activities that include constant low rev driving, short journeys, continual stop-start journeys, long idling, and poor fuel quality.

SUMMARY OF THE INVENTION

The instant invention in one form is directed to a system for controlling production of ozone for an internal combustion engine. The system includes an ozone generator mounted to an engine of a vehicle. The ozone generator includes a tubular containment shell having a first and second opening for allowing air to flow therethrough, and first and second cylindrical electrodes disposed inside the tubular containment shell permitting air to flow through. The system includes a high voltage source connected between the first and second electrode, the high voltage source capable of producing a voltage differential between the first and second electrodes sufficient to cause the production of ozone. The ozone generator is disposable in an air intake system of a vehicle having the internal combustion engine, the ozone generator permitting air to flow therethrough wherein a change from oxygen to ozone occurs in the air flowing through the ozone generator and into the internal combustion engine. The system includes at least one control module for controlling production of ozone by the ozone generator. The control module communicates with a power inverter in the ozone generator, a sensor on the ozone generator, and the internal combustion engine. The control module may be a frequency control module or a voltage control module for controlling the ozone generator voltage for maximizing performance. The control module may be a temperature control module for activating a cooling system of the ozone generator or the control circuit. The control module may be a flow control module for adjusting air flow through the ozone generator. The control module may be a timer control module for determining state of ozone generator (ON/OFF) as a function of mileage and time and for keeping track of mileage and time. The control module may be an emergency shutoff module.

The system may include at least one monitor module. The monitor module communicates with the control module, the sensor on the ozone generator, and the internal combustion engine. The monitor module includes monitoring features which may be incorporated into the at least one control module. The monitor module is for detecting engine parameters and for monitoring the production of ozone. The monitor module may be a frequency monitor module or a voltage monitor module having a voltage sensor disposed on the ozone generator for determining the voltage supplied to the ozone generator. The monitor module may be a temperature monitor module including at least one temperature sensor for determining the temperature of the ozone generator, control circuit, or a portion of the internal combustion engine. The monitor module may be an air flow monitor which monitors air flow through the ozone generator. The monitor module may be a timer monitor module for generating time interval for the control circuit to work with. The monitor module may be an emergency monitor module for alerting a user to an engine or generation system having an out of range parameter. The monitor module monitors structural parameters including the integrity of each component of the ozone generator. The monitor module monitors fuel parameters including instant fuel usage, average fuel usage, fuel put into the fuel storage tank and other static or dynamic fuel functions. The monitor module may be integrated with the at least one control module to perform both monitoring and controlling functions.

The instant invention in another form is directed to an ozone generation system for an internal combustion engine. The ozone generation system includes an ozone generator having a conductive cylindrical containment shell having a first and second opening for allowing air to flow therethrough. The system includes a first cylindrical electrode and a second cylindrical electrode, both disposed inside the conductive cylindrical containment. The system includes a high voltage source connected between the first and second cylindrical electrode, the high voltage source capable of producing a voltage differential between the first and second cylindrical electrode sufficient to cause production of ozone.

The ozone generator permits air to flow therethrough wherein a change from oxygen to ozone occurs in the air flowing through the ozone generator. The system includes at least one monitor module including a voltage sensor disposed on the ozone generator for sensing the voltage differential between the first and second cylindrical electrode and at least one control module for controlling the voltage differential between the first and second cylindrical electrode. The system may include a dielectric element disposed between the first and second cylindrical electrode. The dielectric element is preferably glass and more preferably quartz glass. The system may include a temperature monitor module including at least one temperature sensor. The system may include an air flow monitor for monitoring air flow through the ozone generator. The system may include an emergency monitor module for alerting a user to an engine or generation system having an out or range parameter. The system may include an emergency shutoff module for terminating power to the high voltage source. The system may include an engine monitor module for detecting engine parameters.

In another aspect, the system includes an ozone generator having a tubular containment shell having a first and second opening for allowing air to flow therethrough, a first and second cylindrical electrode disposed inside the tubular containment shell permitting air to flow therethrough and a high voltage source connected between the first and second electrode, the high voltage source capable of producing a voltage differential between the first and second electrode sufficient to cause production of ozone. The ozone generator is disposable in an air intake system of a vehicle having the internal combustion engine. The ozone generator permits air to flow therethrough wherein a change from oxygen to ozone occurs in the air flowing through the ozone generator and into the internal combustion engine. The system includes at least one monitor module for monitoring parameters of the system and at least one control module for controlling the production of the ozone. The monitor module may measure a first temperature of the ozone generator and a second temperature of the high voltage source. The ozone generator may include a dielectric element disposed between the first and second electrode. The dielectric element may be glass. The tubular containment shell may be cylindrical. The first and second electrode may be coaxially aligned with the tubular containment shell, the first electrode spaced a distance from the second electrode, the first electrode being aligned axially within the second electrode. The control module is a frequency control module for controlling modulation frequency of the high voltage source. The control module is a module for adjusting air flow through the ozone generator. The control module may also be a timer control module for maintaining records of time and vehicle mileage. The control module may be an emergency shutoff module for disconnecting the high voltage source from the first and second electrode. The monitor module monitors structural parameters including integrity of each component of the ozone generator.

In another aspect, the system includes an ozone generator including a conductive cylindrical containment shell having a first and second opening for allowing air to flow therethrough, first and second cylindrical electrodes disposed inside the conductive cylindrical containment shell permitting air to flow therethrough, and a high voltage source connected between the first and second electrode, the high voltage source capable of producing a voltage differential between the first and second electrodes sufficient to cause production of ozone. The ozone generator permits air to flow therethrough wherein a change from oxygen to ozone occurs in the air flowing through the ozone generator. The system includes at least one control module selected from a first group consisting of a frequency control module, a voltage control module for controlling an ozone generator voltage for maximizing performance, an air flow control module for adjusting air flow through the ozone generator, a timer control module for determining state of ozone generator (ON/OFF) as a function of mileage and time, and for keeping track of mileage and time, and an emergency shutoff module. The system includes at least one monitor module selected from a second group of a frequency monitor module, a voltage monitor module including a voltage sensor disposed on the ozone generator for determining the voltage differential supplied to the ozone generator, a temperature monitor module including at least one temperature sensor for determining a temperature of a portion of the system, an air flow monitor for monitoring the air flow through the ozone generator, a timer monitor module for generating time intervals for the control module and the monitor module, and an emergency monitor module for alerting a user to the engine or the system having an out of range parameter.

In another aspect, a system for using ozone for an internal combustion engine includes an ozone generator. The ozone generator includes a containment shell having a first and second opening for allowing air to flow therethrough, first and second concentric cylindrical electrodes disposed inside the containment shell and a high voltage source connected between the first and second concentric cylindrical electrode, the high voltage source capable of producing a voltage differential between the first and second concentric cylindrical electrode sufficient to cause production of ozone. The ozone generator permits air to flow therethrough wherein a change from oxygen to ozone occurs in the air flowing through the ozone generator. The system includes a safety module including at least one ozone sensor for sensing the ozone exterior to the containment shell and a control module for controlling the voltage differential from the high voltage source. The control module includes an input from the at least one ozone sensor. Controlling the voltage applied between the first and second concentric cylindrical electrode may include controlling amplitude of the voltage or controlling frequency of the voltage or controlling the amplitude and frequency of the voltage.

In another aspect, a system uses ozone for cleaning of an internal combustion engine. The system includes a case having a case housing and an inner cavity. The case includes a user control panel having a plurality of user controls, the user control panel disposed on the case housing and an ozone generator in the inner cavity, the ozone generator including a containment shell having a first and second opening for allowing air to flow therethrough, a first and second concentric cylindrical electrode disposed inside the containment shell and a controllable high voltage source connected between the first and second cylindrical electrode wherein the containment shell permits air to flow therethrough wherein a change from oxygen to ozone occurs in the air flowing through the containment shell. The case includes a blower having a first blower end for intake of air external to the case and a second blower end connected to the containment shell first opening and a safety module including at least one safety sensor connected thereto, a control module connected to the user control panel and the safety module, the control module for controlling voltage applied between the first and second concentric cylindrical electrode. The system includes a tube connecter having a first connector end connected to the containment shell second opening and a second connector end disposed on the case housing. The system includes an ozone transport tube having a first tube end scalable to the second tube connector end and a second tube end for connection to the internal combustion engine. The blower directs the ozone through the tube ozone generator, the tube connector and the ozone transport tube during operation of the internal combustion engine, whereby the ozone reacts with deposits in the internal combustion engine for removal of the deposits. Controlling the voltage applied between the first and second concentric cylindrical electrode may include controlling amplitude of the voltage or controlling frequency of the voltage or controlling the amplitude and frequency of the voltage. The system may include a dielectric element disposed between the first and second cylindrical electrode. The system may include an engine monitor module for detecting engine parameters.

In another aspect, a method of using ozone for maintaining an internal combustion engine, the method includes providing a maintenance system having a case with a case housing and an inner cavity. The case includes a user control panel inside the inner cavity, an ozone generator inside the inner cavity, a blower inside the inner cavity, the blower having a first blower end for intake of air external to the case and a second blower end connected to the ozone generator and a safety module including at least one safety sensor connected thereto. The maintenance system includes a control module connected to the ozone generator and the safety module, the control module for controlling a voltage applied to the ozone generator, a tube connecter having a first connector end connected to the ozone generator and a second connector end disposed on the case housing and an ozone transport tube having a first tube end scalable to the second tube connector end and a second tube end for connection to the internal combustion engine. The method includes connecting the second tube end of the ozone transport tube to an air intake of the internal combustion engine, ensuring the internal combustion engine is running and commencing production of the ozone and directing the ozone through the ozone transport tube during operation of the internal combustion engine. The method includes allowing the ozone to react with deposits in the internal combustion engine and after a specific amount of time, stopping production of the ozone and disconnecting the second tube end of the ozone transport tube from the air intake of the internal combustion engine. The control module may adjust air flow through the ozone generator. The control module may include a timer control for determining an amount of time ozone is generated by the ozone generator. The control module may include an emergency shutoff for terminating production of the ozone. The control module may monitor structural parameters including integrity of each component of the ozone generator.

In another aspect, a system uses ozone for an internal combustion engine and includes an ozone generator. The ozone generator includes a containment shell having a first and second opening for allowing air to flow therethrough, first and second concentric cylindrical electrodes disposed inside the containment shell and a high voltage source connected between the first and second concentric cylindrical electrode, the high voltage source capable of producing a voltage differential between the first and second concentric cylindrical electrode sufficient to cause production of ozone. The ozone generator permits air to flow therethrough wherein a change from oxygen to ozone occurs in the air flowing through the ozone generator. The system includes a safety module having at least one sensor for sensing the ozone exterior to the containment shell or high voltage exterior to the containment shell. The system includes a control module for controlling the voltage differential from the high voltage source. The control module includes an input from the at least one sensor. There is preferably at least one ozone sensor in the system. Controlling the voltage includes controlling amplitude of the voltage or controlling frequency of the voltage or a combination of controlling the frequency and the voltage.

In another aspect, the invention is a method of using ozone for maintaining an internal combustion engine using the system described above. The method includes connecting the containment shell to an air intake of the internal combustion engine, ensuring the internal combustion engine is running, commencing production of the ozone and directing ozone into the air intake of the internal combustion engine, allowing the ozone to react with deposits in the internal combustion engine. The method may include providing timing intervals of ozone production based on engine performance feedback. The method may include providing timing intervals of ozone production based on sensor feedback. The method may include providing timing intervals of ozone production based on AI feedback through an AI database system trained on vehicle manufacturing data and system feedback.

These and other objects, features, and advantages of the present invention will become more readily apparent from the attached drawings and the detailed description of the preferred embodiments, which follow.

BRIEF DESCRIPTION OF THE DRAWINGS

A further understanding of the nature and advantages of particular embodiments may be realized by reference to the remaining portions of the specification and the drawings, in which like reference numerals are used to refer to similar components. When reference is made to a reference numeral without specification to an existing sub-label, it is intended to refer to all such multiple similar components.

Corresponding reference characters indicate corresponding parts throughout the several views. The exemplifications set out herein illustrate embodiments of the invention and such exemplifications are not to be construed as limiting the scope of the invention in any manner.

DESCRIPTION OF THE PREFERRED EMBODIMENT(S)

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art however that other embodiments of the present invention may be practiced without some of these specific details. Several embodiments are described herein, and while various features are ascribed to different embodiments, it should be appreciated that the features described with respect to one embodiment may be incorporated with other embodiments as well. By the same token however, no single feature or features of any described embodiment should be considered essential to every embodiment of the invention, as other embodiments of the invention may omit such features.

In this application the use of the singular includes the plural unless specifically stated otherwise and use of the terms "and" and "or" is equivalent to "and/or," also referred to as "non-exclusive or" unless otherwise indicated. Moreover, the use of the term "including," as well as other forms, such as "includes" and "included," should be considered non-exclusive. Also, terms such as "element" or "component" encompass both elements and components including one unit and elements and components that include more than one unit, unless specifically stated otherwise.

Lastly, the terms "or" and "and/or" as used herein are to be interpreted as inclusive or meaning any one or any combination. Therefore, "A, B, or C" mean A; B; or C; and "A, B and/or C" mean "any of the following: A; B; C; A and B; A and C; B and C; or A, B and C." An exception to this definition will occur only when a combination of elements, functions, steps or acts are in some way inherently mutually exclusive.

As this invention is susceptible to embodiments of many different forms, it is intended that the present disclosure be considered as an example of the principles of the invention and not intended to limit the invention to the specific embodiments shown and described.

The term ozone generator is the portion of the ozone generation system which produces the oxygen to ozone reaction.

The term tubular is meant an elongated hollow structure having tube walls which may be cylindrical, square, oval or other shape which may be symmetrical or asymmetrical. One example of a tube would be a square tube for shipping or for fabricating metal frame structures.

Figure 1:
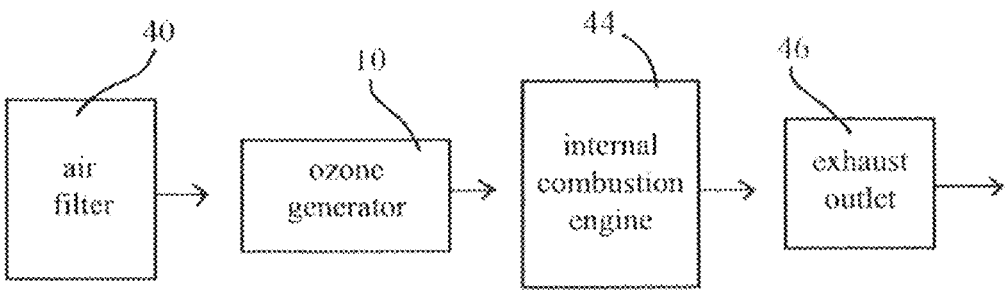
FIG. 1 is a block diagram of the ozone generation system for an internal combustion engine according to at least one embodiment of the present invention.

Referring now to the drawings FIGS. 1-19, and more particularly to FIG. 1, there is shown an embodiment of the ozone generation system for an internal combustion engine according to the present invention.

The system uses the ozone generator for increasing fuel efficiency and reducing emissions in an internal combustion engine. The system includes an air filter 40 which filters incoming atmospheric air and feeds it to an ozone generator 10. Ozone generator 10 converts the oxygen in the air to ozone, which is then fed into the internal combustion engine 44 for combustion with a desired fuel, such as diesel, gasoline, ethanol, natural gas, or other liquid or gaseous fuel. The ozone is a stronger oxidation gas than oxygen and allows the fuel to burn more completely, increasing efficiency and passing fewer emissions through the exhaust outlet 46.

Figure 2:
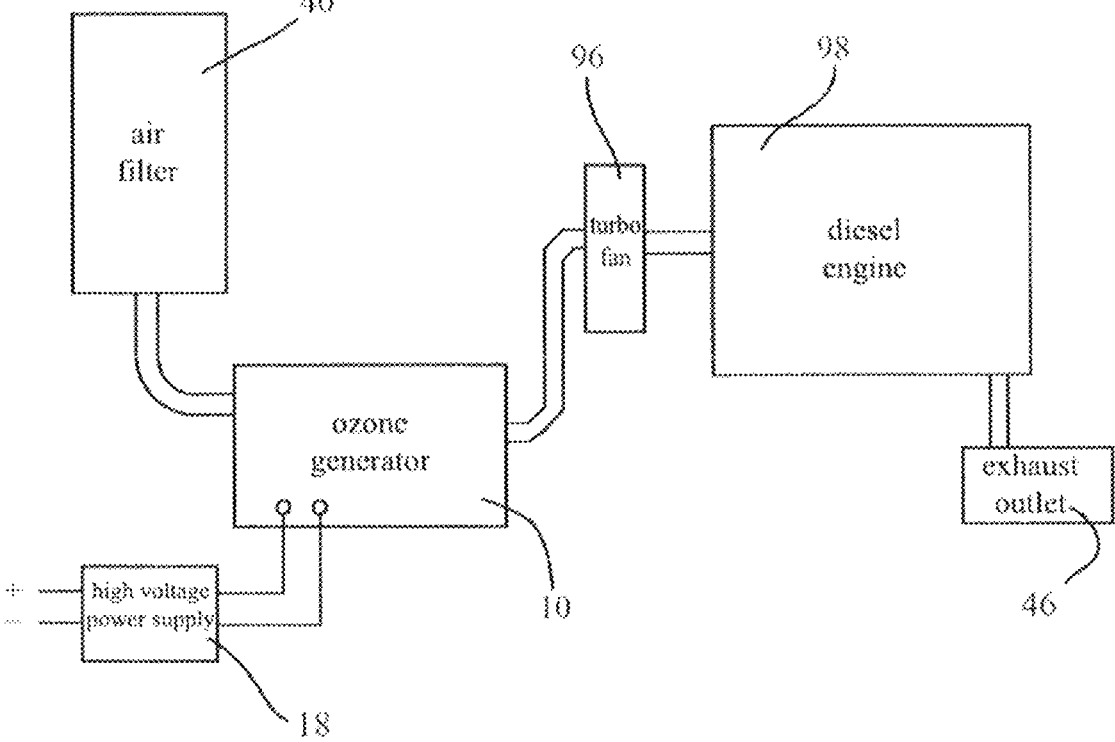
FIG. 2 is a block diagram of the ozone generation system for a diesel engine according to at least one embodiment of the present invention.
Figure 3:
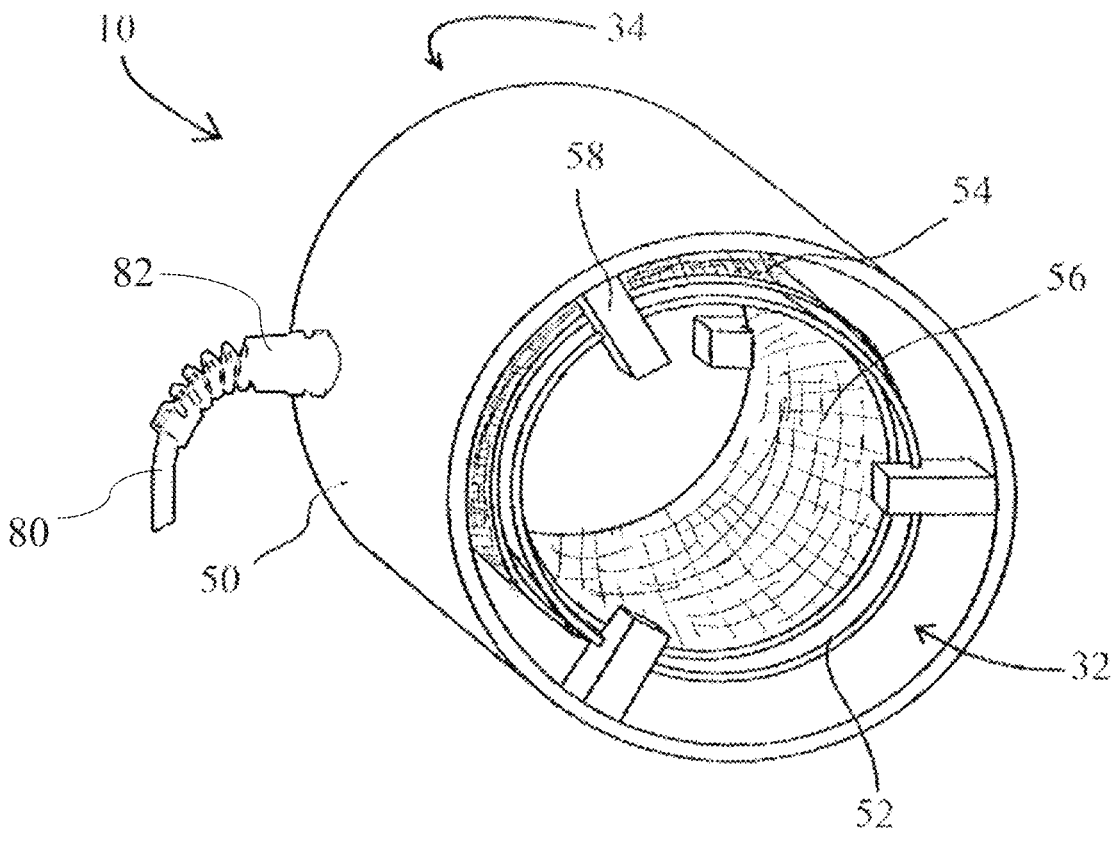
FIG. 3 is a perspective view of the ozone generator according to at least one embodiment of the present invention.
Figure 4:
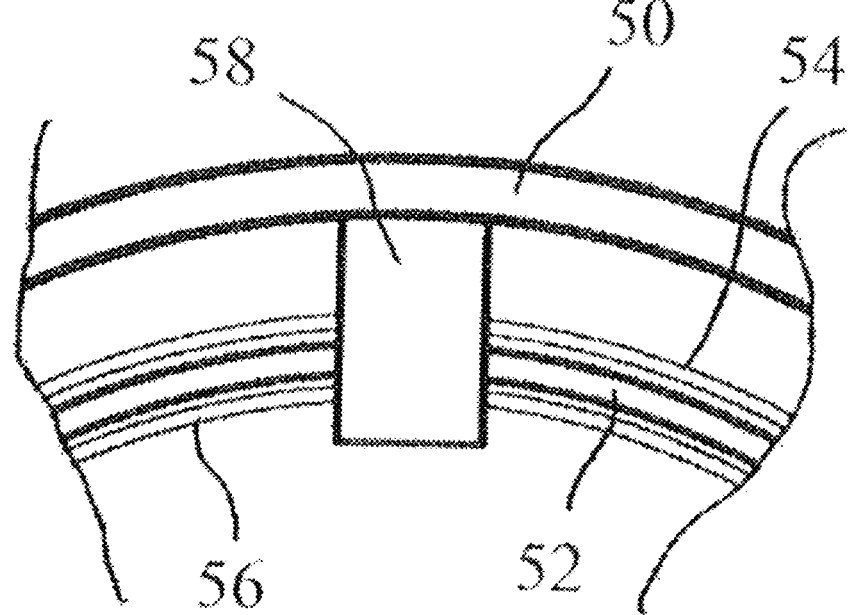
FIG. 4 is a front elevational view of the ozone generator shown in FIG. 3.
Figure 5:
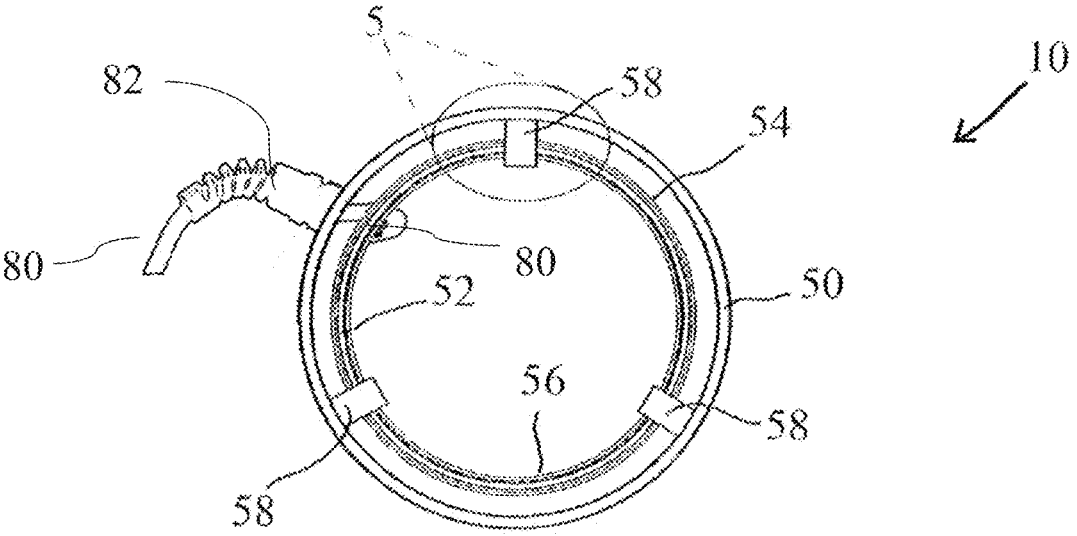
FIG. 5 is an enlarged view of a portion of the ozone generator shown in FIG. 4.
Figure 6:
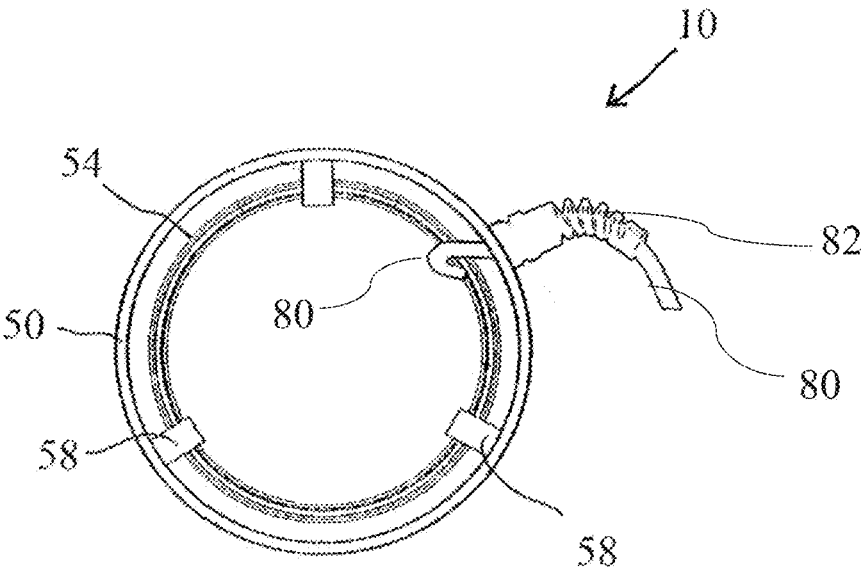
FIG. 6 is a rear elevational view of the ozone generator shown in FIG. 3.

FIG. 2 shows the block diagram for a system more specifically for a diesel engine and includes an air filter 90 flowing air into the ozone generator 10 which is powered by a high voltage power supply 18. The flow of air is compressed by a turbocharger fan 96 which pulls air from the ozone generator 10 and air filter 90 and feeds the compressed air to the diesel engine 98. After the diesel engine burns the fuel, the product of combustion is forced through the exhaust outlet 46.

FIGS. 3-6 show a first embodiment of the ozone generator according to the present invention. The containment shell 50 or housing is a rigid tube, which includes first and second openings 32, 34 at the opposite ends that allow air to pass through the tube when there is a pressure differential between the first opening 32 and the second opening 34. A cylindrical outer electrode 54 and a cylindrical inner electrode 56 are radially separated by a cylindrical dielectric sleeve 52, and are coaxially disposed inside the conductive containment shell 50. The electrodes 54, 56 are preferably a mesh screen. The dielectric sleeve 52 is preferably a quartz glass although other glass materials or polycarbonate such as Lexan may be used, all of which have high strength dielectric properties. Other dielectric materials may be used. At least one, and preferably three, short supporting insulator members 58 are attached to and extend inwardly between the conductive containment shell 50 and the dielectric sleeve 52 at spaced intervals adjacent each opening 32. Alternately, the insulator members 58 may be attached to and extend between the conductive tube 50 and at least one of the inner electrode 56, outer electrode 54 and dielectric sleeve 52. The insulator members 58 are preferably of polyetheretherketone (PEEK) material although Teflon® or other aggressive environment material may be used. A high voltage insulated wire 80 connects the high voltage source to the inner electrode 56 and extends through a tube wall opening in the containment shell 50. A strain relief 82 protects the high voltage insulated wire 80 from contact with the edges of the tube opening. Shown in FIG. 6, the high voltage insulated wire 80 extends from the tube wall opening to the cylindrical inner electrode 56 by going around the cylindrical outer electrode 54 and dielectric sleeve 52.

In one embodiment, the inner electrode 56 has a cylindrical shape and includes an opening or cavity which extends from one end of the cylinder to the opposite end whereby air may freely pass through the opening or cavity without obstruction. The outer electrode 54 has a larger diameter than, and is coaxially aligned with, the inner electrode 56. Air may also flow between the containment shell 50 and the outer electrode 54 as it passes longitudinally through the shell.

When a high voltage differential is placed between the outer electrode 54 and the inner electrode 56, oxygen passing inside the containment shell 50 is converted to ozone by combining a single oxygen atom with an oxygen molecule to form ozone. The containment shell 50 is conductive and preferably grounded to the vehicle. Alternately, the containment shell may be non-conductive.

The ozone generator is powered by connection to the variable high voltage and adjustable frequency power supply. A DC to AC inverter converts the 12 VDC battery voltage to at least about 3000 volts AC, and as high as about 32,000 volts AC or more, at a frequency preferably between about 300 and 3,000 Hertz. Both the output voltage and frequency are adjustable. The metal electrodes are attached to the high voltage output of the inverter which in turn produces ozone from the oxygen in the air passing within the shell. In order to achieve maximum efficiency in fuel savings and smog reduction, the entire screen tube is preferably installed directly between the existing air filter and the turbo charger of the diesel engine. The incoming filtered clean air is passed through the electrically charged electrode 5 plates, where the oxygen in the air is converted to ozone and subsequently enters the combustion chamber of the diesel engine. The ozone facilitates the diesel fuel to burn more efficiently and minimizes the residual exhaust particulars, wherein the output of the ozone generator 10 is fed through a generator filter where it combines with the air flowing through the air filter 40, 90 and turbo charger fan 96 and feeds to the intake of an internal combustion engine.

Figure 7A:
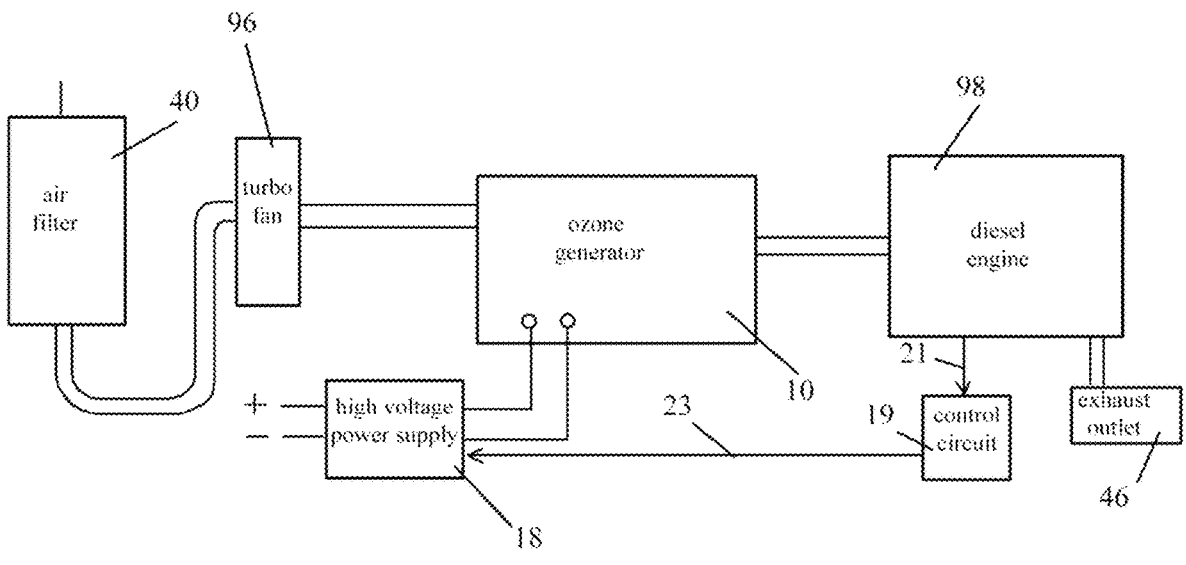
FIG. 7A is a block diagram of a second embodiment of an ozone generation system for a diesel engine according to the present invention.
Figure 7B:
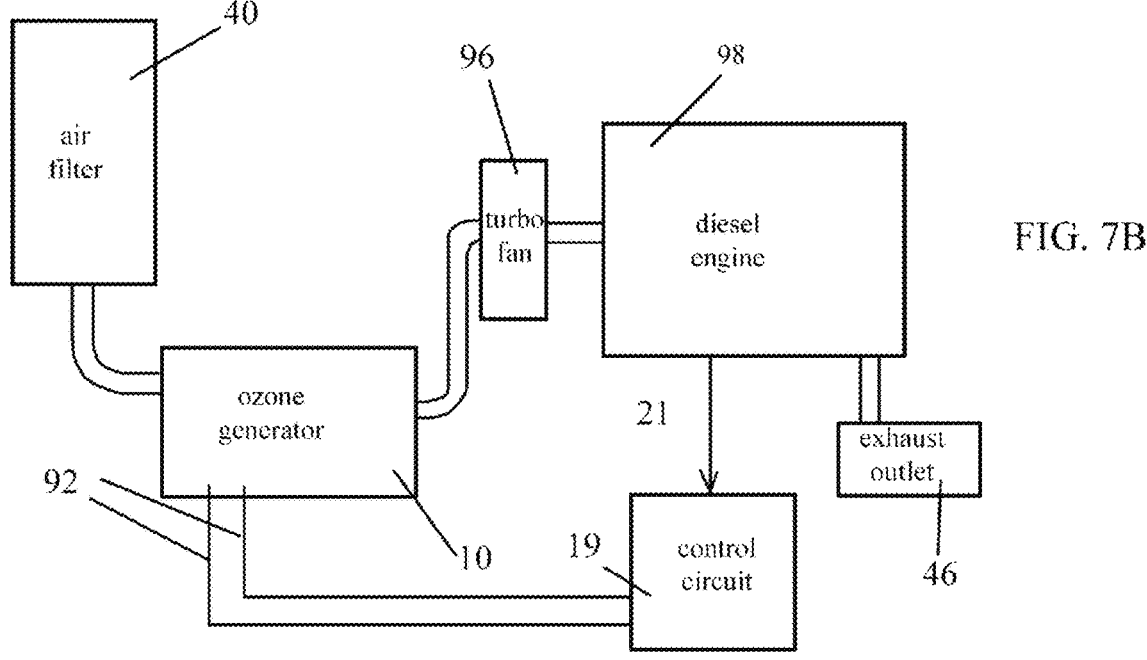
FIG. 7B is a block diagram of a third embodiment of an ozone generation system for a diesel engine according to the present invention.
Figure 8:
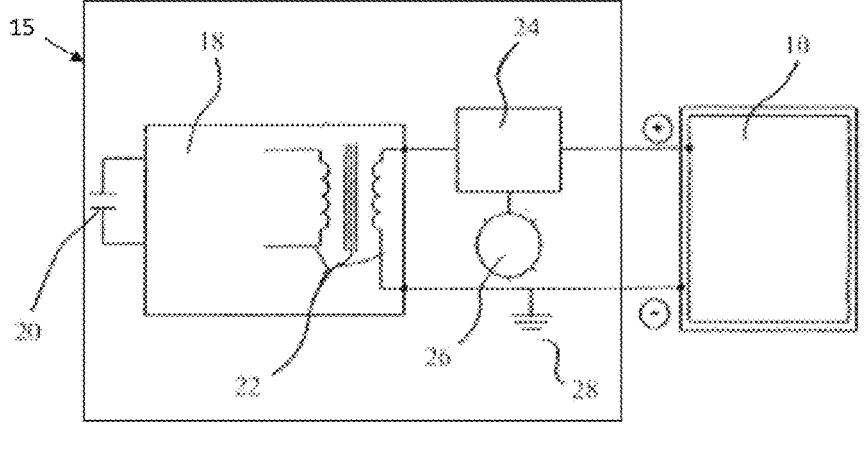
FIG. 8 is a block diagram of a high voltage circuit for supplying power to the ozone generator.
Figure 9:
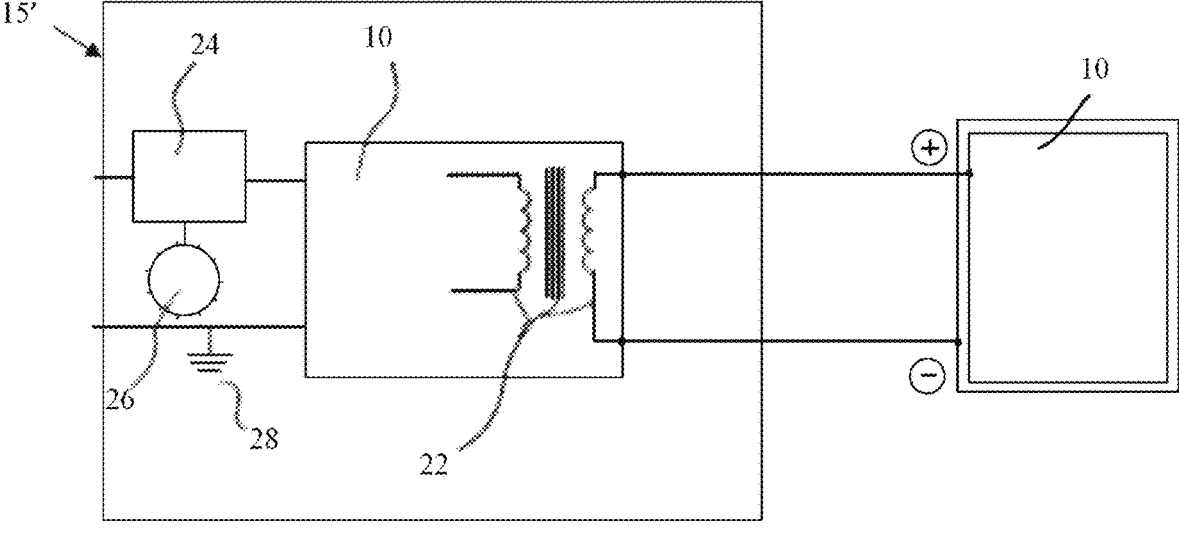
FIG. 9 is a block diagram of another embodiment of a high voltage circuit for supplying power to the ozone generator according to the present invention.

FIG. 7A is a block diagram of a second embodiment of an ozone generation system for a diesel engine according to the present invention;

FIG. 7B is a block diagram of a third embodiment of an ozone generation system for a diesel engine according to the present invention;

FIG. 8 is a block diagram of a high voltage circuit for supplying power to the ozone generator. An electronic circuit 15 powers the ozone generator 10 and includes a 12-volt battery 20 and a power inverter 18 having a high ratio step-up transformer 22. The circuit 15 includes a power detector 24 which monitors the voltage from the power inverter 18 and sends power to illuminate a lamp 26 when voltage is detected. One terminal 20 of the power inverter 18 may be connected to a ground terminal 28. The voltage is then fed to the ozone generator 10. FIG. 9 is a block diagram of another embodiment of the high voltage circuit 15'. The high voltage circuit 15' includes the power detector 24 at the low voltage side of the circuit rather than the high voltage side of the circuit 15'.

Figure 10:
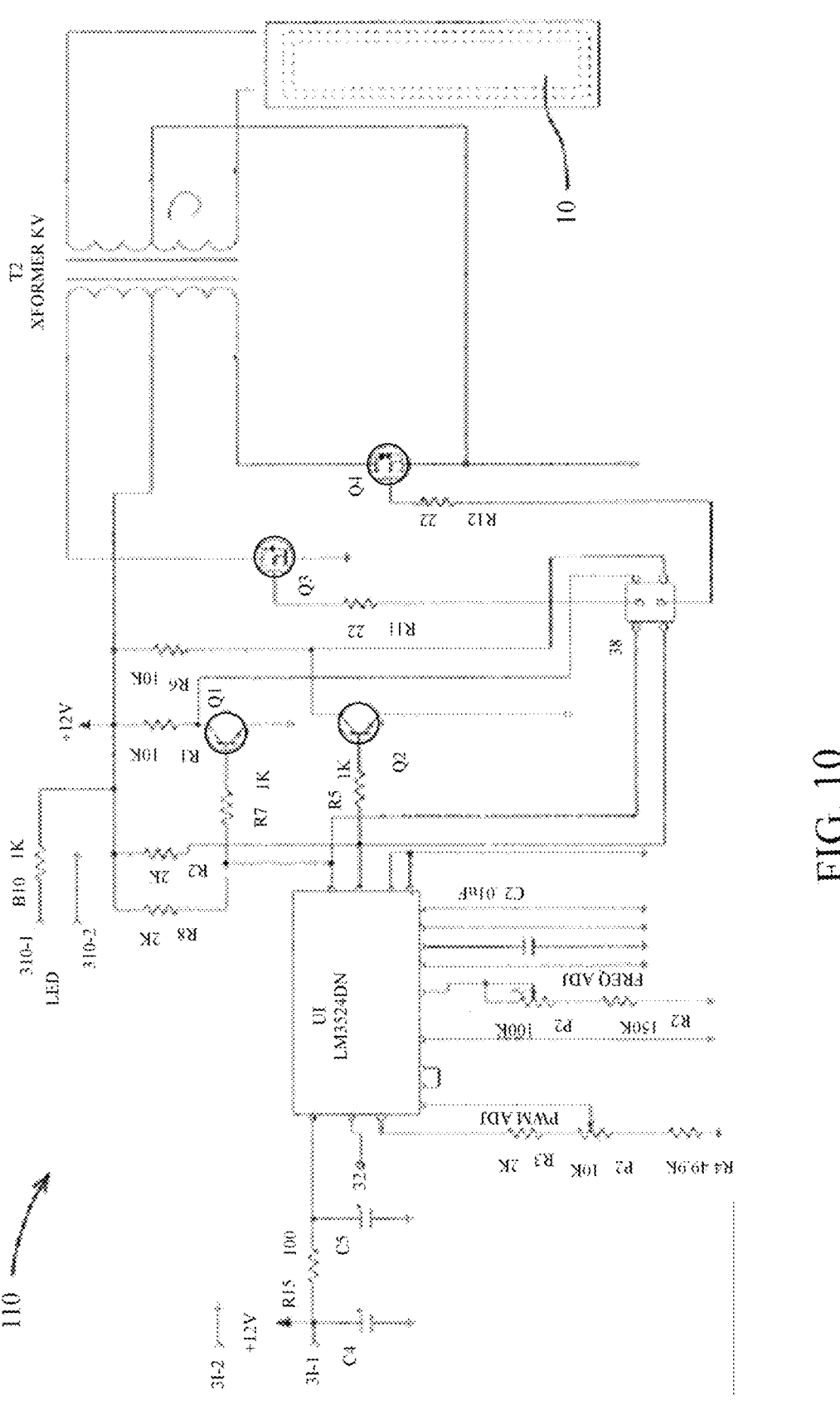
FIG. 10 is a schematic diagram of the components for the circuit shown in FIG. 9.

FIG. 10 is a schematic diagram 110 of the components for the power inverter 18 shown in FIGS. 8 and 9. The feedback information may control the voltage output, frequency output, or voltage and frequency of the power supply in order to control the amount of ozone delivered to the internal combustion engine. As the speed or power output of the engine increases, the power circuit self-adjusts to provide more ozone to the engine since more oxidation of the fuel is necessary. Inversely, as the speed of the engine or the power output decreases, the feedback information is sent to the power supply in order to reduce the generation of ozone. This will prevent over-generation of ozone. This voltage, by magnetic action through transformer Tl, steps up the 12 volts direct current to as high as 32,000 volts. The output voltage is adjustable from about 3,000 volts to 32,000 volts and the frequency is adjustable. The circuit preferably provides a high voltage alternating semi-square wave to the ozone generator.

The circuit 110 uses a pair of transistors Q3, Q4 in a push-pull configuration to produce a voltage across the primary coil of a transformer Tl having a center tap connected to the 12v supply positive terminal. The transformer Tl secondary voltage is applied across the ozone generator terminals and the secondary center tap of the transformer Tl is connected to the ground terminal. This circuit configuration with the center taps of the primary and secondary coils of transformer Tl connected to the terminals of the 12-volt voltage source reduces stress on the transformer coils, allowing for a smaller transformer size compared to a circuit which does not implement the transformer center tap in this way.

Figure 11:
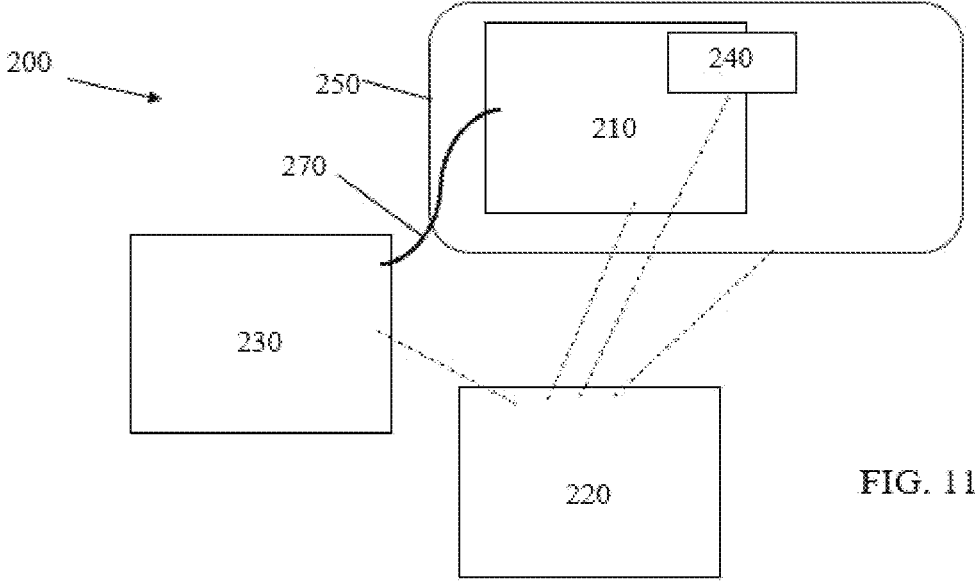
FIG. 11 is a block diagram showing the system for controlling production of ozone for an internal combustion engine.

FIG. 11 is a block diagram showing a system 200 for controlling production of ozone for an internal combustion engine. The system 200 includes an ozone generator 210 mounted to an engine 250 of a vehicle. As shown in greater detail in FIGS. 3-6, the ozone generator includes a tubular containment shell 50 having a first and second opening for allowing air to flow therethrough and first and second cylindrical electrodes 54, 56 disposed inside the tubular containment shell 50 permitting air to flow through. The system 200 includes a high voltage power inverter 230 connected with a wire 270 between the first and second cylindrical electrodes 54, 56, of the ozone generator; the high voltage power inverter 230 capable of producing a voltage differential between the first and second electrodes 54, 56 sufficient to cause the production of ozone. The ozone generator 210 is disposable in an air intake system of a vehicle having the internal combustion engine, the ozone generator permitting air to flow therethrough wherein a change from oxygen to ozone occurs in the air flowing through the ozone generator and into the internal combustion engine. The system 200 includes at least one control module 220 for controlling production of ozone by the ozone generator 210. The control module 220 communicates with the power inverter 230, the ozone generator 210, a sensor 240 on the ozone generator 210 and the internal combustion engine 250. The control module 220 may be a frequency control module or a voltage control module for controlling the ozone generator voltage for maximizing performance. The control module 220 may be a temperature control module for activating a cooling system of the ozone generator or the control circuit. The control module 220 may be a flow control module for adjusting air flow through the ozone generator. The control module 220 may be a timer control module for determining state of ozone generator (ON/OFF) as a function of mileage and time and for keeping track of mileage and time. The control module 220 may be an emergency shutoff module.

Figure 12:
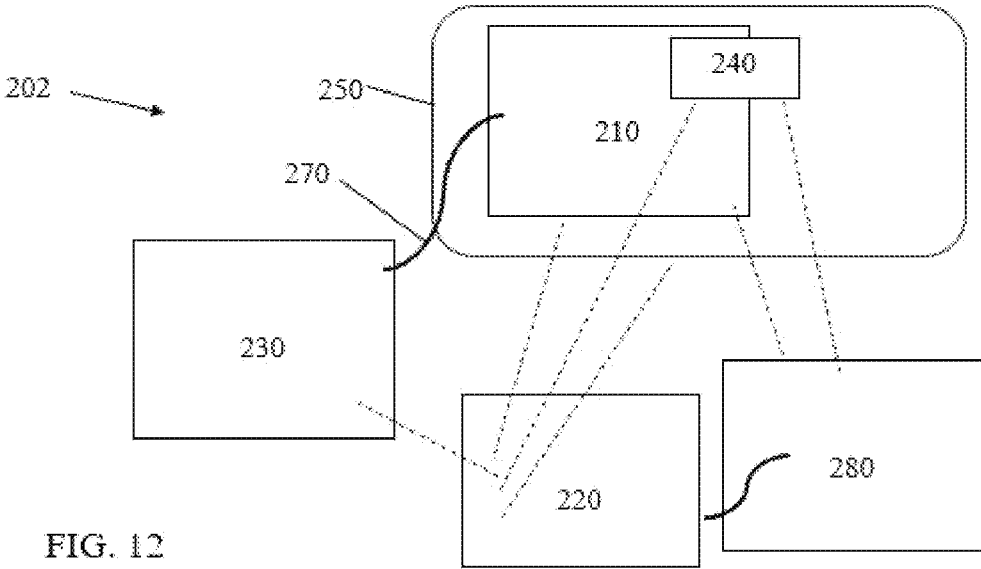
FIG. 12 is a block diagram showing an alternate system for controlling production of ozone for an internal combustion engine.

In one embodiment shown in FIG. 12, the system 202 includes at least one monitor module 280. The monitor module 280 communicates with the at least one control module 220, a sensor 240 on the ozone generator 210, and the internal combustion engine 250. The monitor module 280 includes monitoring features which may be incorporated into the at least one control module. The monitor module 280 detects engine parameters and monitors the production of ozone. The monitor module 280 may be a frequency monitor module or a voltage monitor module having a voltage sensor 240 disposed on the ozone generator for determining the voltage supplied to the ozone generator 210. The monitor module 280 may be a temperature monitor module including at least one temperature sensor for determining the temperature of the ozone generator, control circuit or a portion of the internal combustion engine. The monitor module 280 may be an air flow monitor which monitors air flow through the ozone generator. The monitor module 280 may be a timer monitor module for generating time interval for the control circuit to work with. The monitor module 280 may be an emergency monitor module for alerting a user to an engine or generation system having an out of range parameter. The monitor module monitors structural parameters including the integrity of each component of the ozone generator. The monitor module monitors fuel parameters including instant fuel usage, average fuel usage, fuel put into the fuel storage tank, and other static and/or dynamic fuel functions. The at least one monitor module 280 may be integrated with the at least one control module 220 to perform both monitoring and controlling functions.

Figure 13:
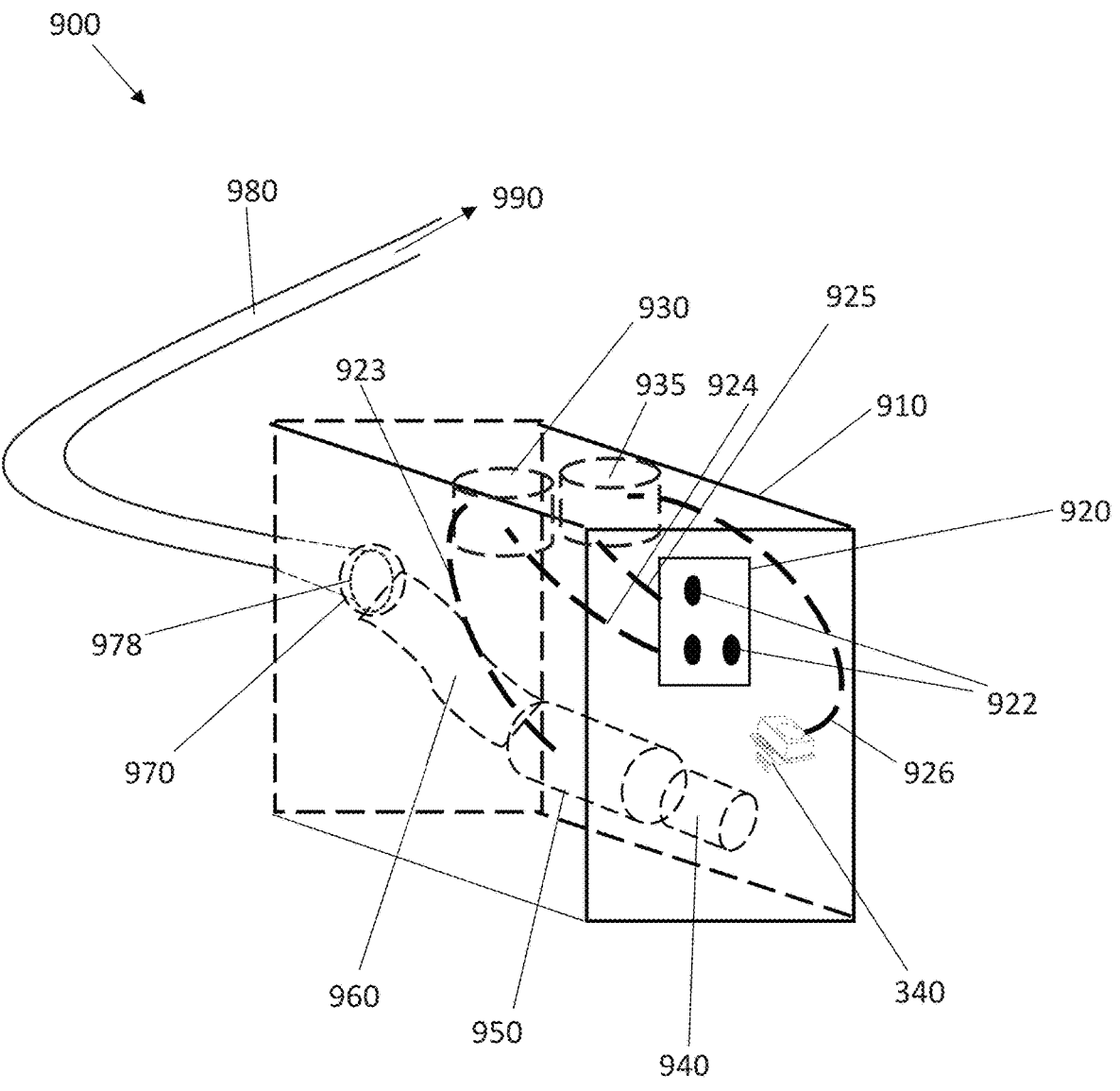
FIG. 13 is a diagram showing the system for maintaining an internal combustion engine.
Figure 14:
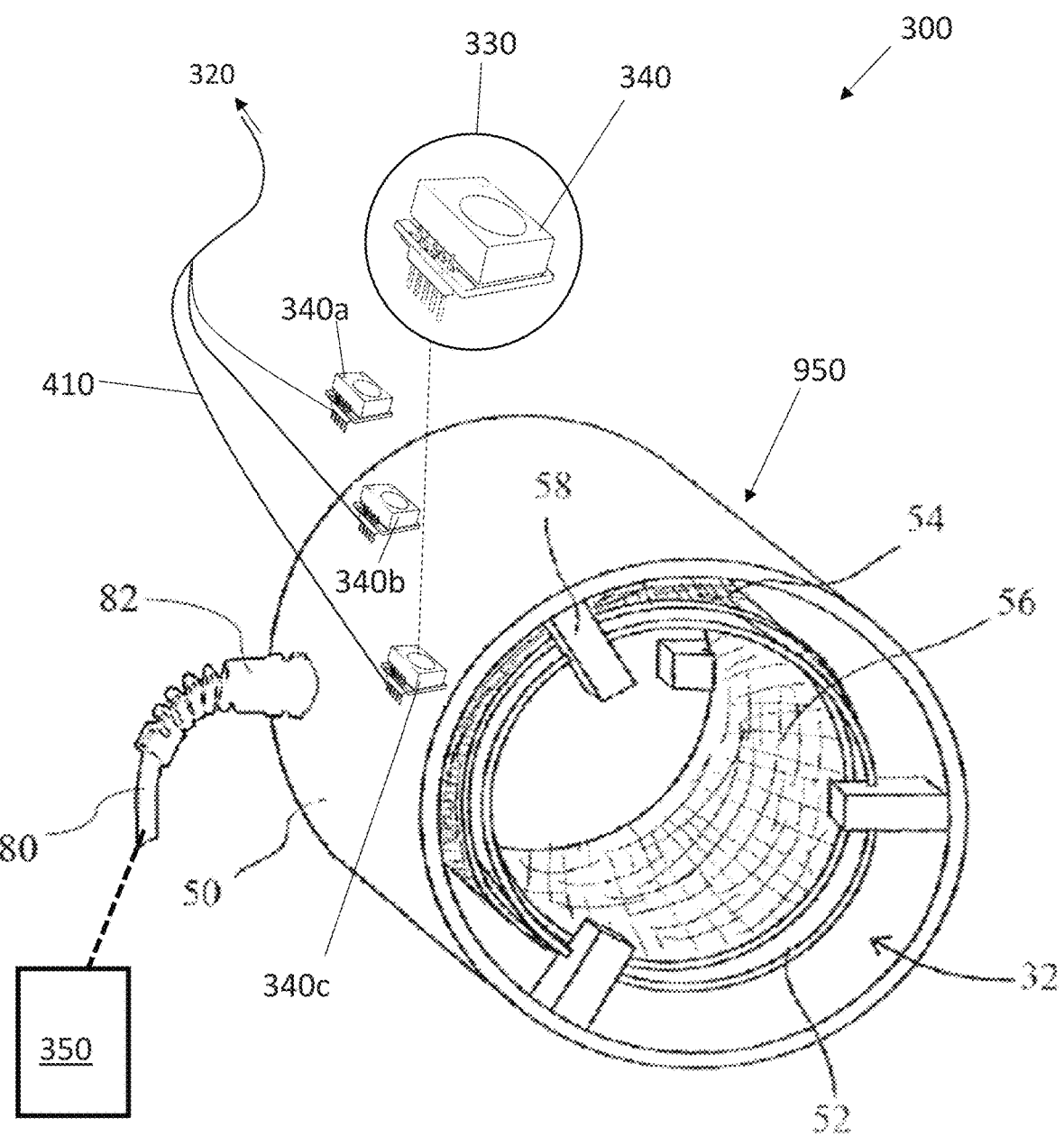
FIG. 14 is a diagram showing safety sensors for sensing ozone outside of the containment shell.
Figure 19:
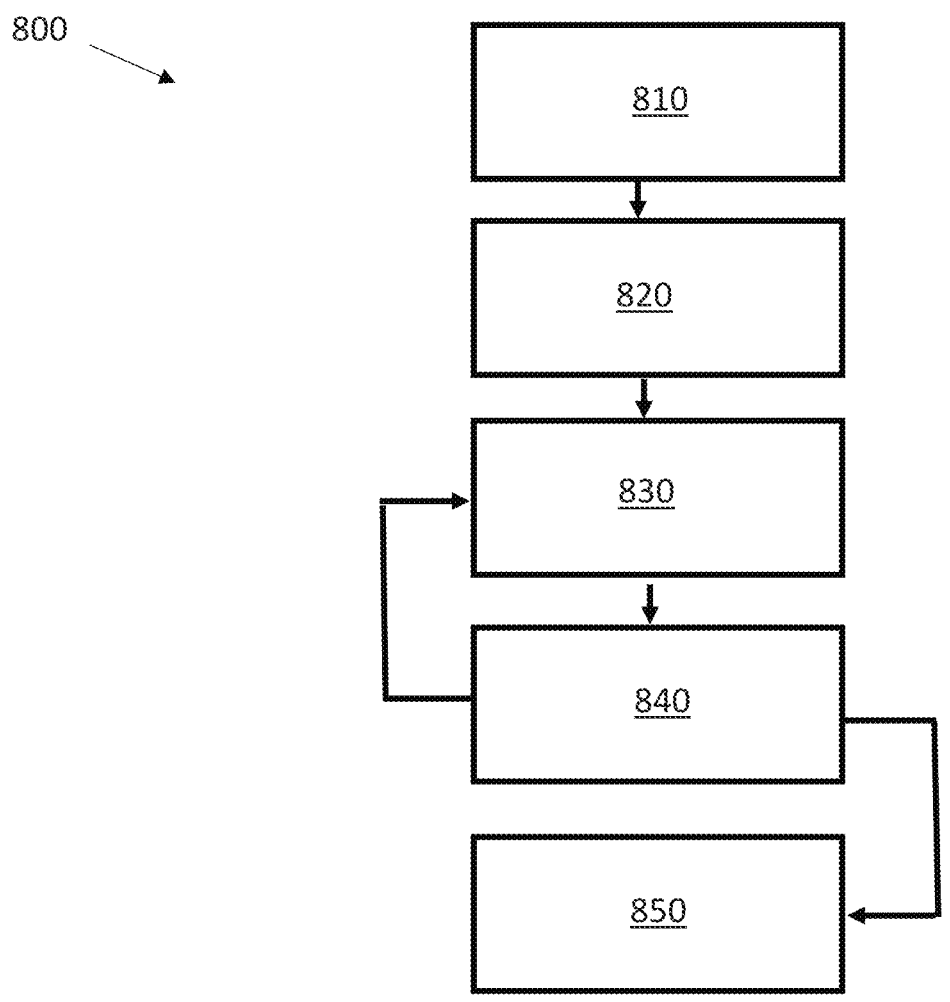
FIG. 19 is a flowchart showing a method of using the system.

FIG. 13 is a diagram showing the system 900 for maintaining an internal combustion engine. The system 900 uses ozone for cleaning or maintenance of the internal combustion engine. FIG. 14 is a diagram showing safety sensors 340 for sensing ozone outside of the containment shell. The safety sensors 340 are preferably an ozone detection cell 340*a* for sensing ozone outside of the containment shell. Voltage sensors 340*b*, pressure sensors 340*c* or flow sensors 340*d* may be used inside or on the outside of the containment shell 50. The system 900 includes a case 910 having a case housing and an inner cavity. The case 910 includes a user control panel 920 having a plurality of user controls 922, the user control panel 920 disposed on the case housing. The case 910 includes an ozone generator 950 in the inner cavity. As shown in FIG. 19 the ozone generator 950 including a containment shell 50 having a first and second opening for allowing air to flow therethrough, a first and second concentric cylindrical electrode 54,56 disposed inside the containment shell 50 and a controllable high voltage source 350 connected between the first and second cylindrical electrode 54,56 wherein the containment shell 50 permits air to flow therethrough wherein a change from oxygen to ozone occurs in the air flowing through the containment shell 50. The case 910 includes a blower 940 having a first blower end for intake of air external to the case 910 and a second blower end connected to the containment shell first opening. The system includes a safety module 935 connected with a transmitting medium or wire 924 to the user control panel 920. The system 900 includes at least one safety sensor 340 connected with a transmitting medium 926 to the user control panel 920 or to the safety module 935. The transmitting medium 926 may be a wire or wireless signal. The system 900 includes a control module 930 connected with a transmitting medium or wire 924 to the user control panel 920 and the safety module 935, the control module 930 for controlling voltage applied through wires 923, between the first and second concentric cylindrical electrode 54,56. The control module 930 is connected to the user control panel 920 through transmitting medium 925. The transmitting medium 925 may be a wire or wireless signal. The system 900 includes a tube connecter 960 having a first tube connector end connected to the containment shell second opening and a second connector end 970 disposed on the case housing 910. The system 900 includes an ozone transport tube 980 having a first tube end 978 scalable to the second tube connector end 970 and a second tube end 990 for connection to the internal combustion engine where ozone is delivered to the engine air intake. The blower 940 directs the ozone through the tube ozone generator 950, the tube connector 960 and the ozone transport tube 980 during operation of the internal combustion engine, whereby the ozone reacts with deposits in the internal combustion engine for removal of the deposits. Controlling the voltage applied between the first and second concentric cylindrical electrode may include controlling amplitude of the voltage or controlling frequency of the voltage or controlling the amplitude and frequency of the voltage. The system 900 may include a dielectric element disposed between the first and second cylindrical electrode. The system 900 may include an engine monitor module for detecting engine parameters.

Figure 15:
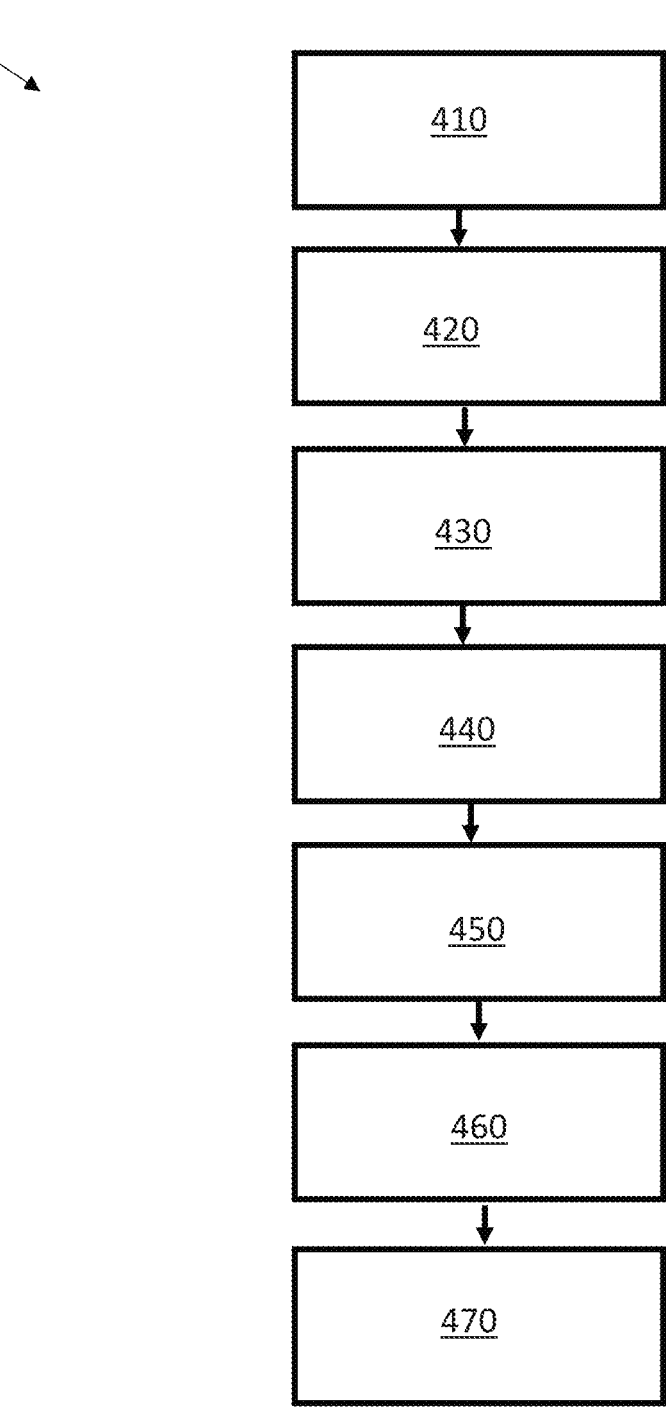
FIG. 15 is a flowchart showing the method for maintaining an internal combustion engine.

FIG. 15 is a flowchart 400 showing a method for maintaining an internal combustion engine. The method includes a step 410 of providing a technician a maintenance system such as the system shown in FIG. 13. The method includes a step 410 of connecting the second tube end of the ozone transport tube to an air intake of the internal combustion engine. The method includes a step 420 of ensuring the internal combustion engine is running. The method includes a step 430 of commencing production of the ozone and directing the ozone through the ozone transport tube during operation of the internal combustion engine. The method includes a step 440 of allowing the ozone to react with deposits in the internal combustion engine for a specific timing interval or specific amount of time. The method includes the a step 450 of disconnecting the second tube end of the ozone transport tube from the air intake of the internal combustion engine. The method may include a step 460 of measuring results and a step 470 of providing a customer with the results to improve probability of a follow up visit, which should be requested at the time of current service.

Figure 16:
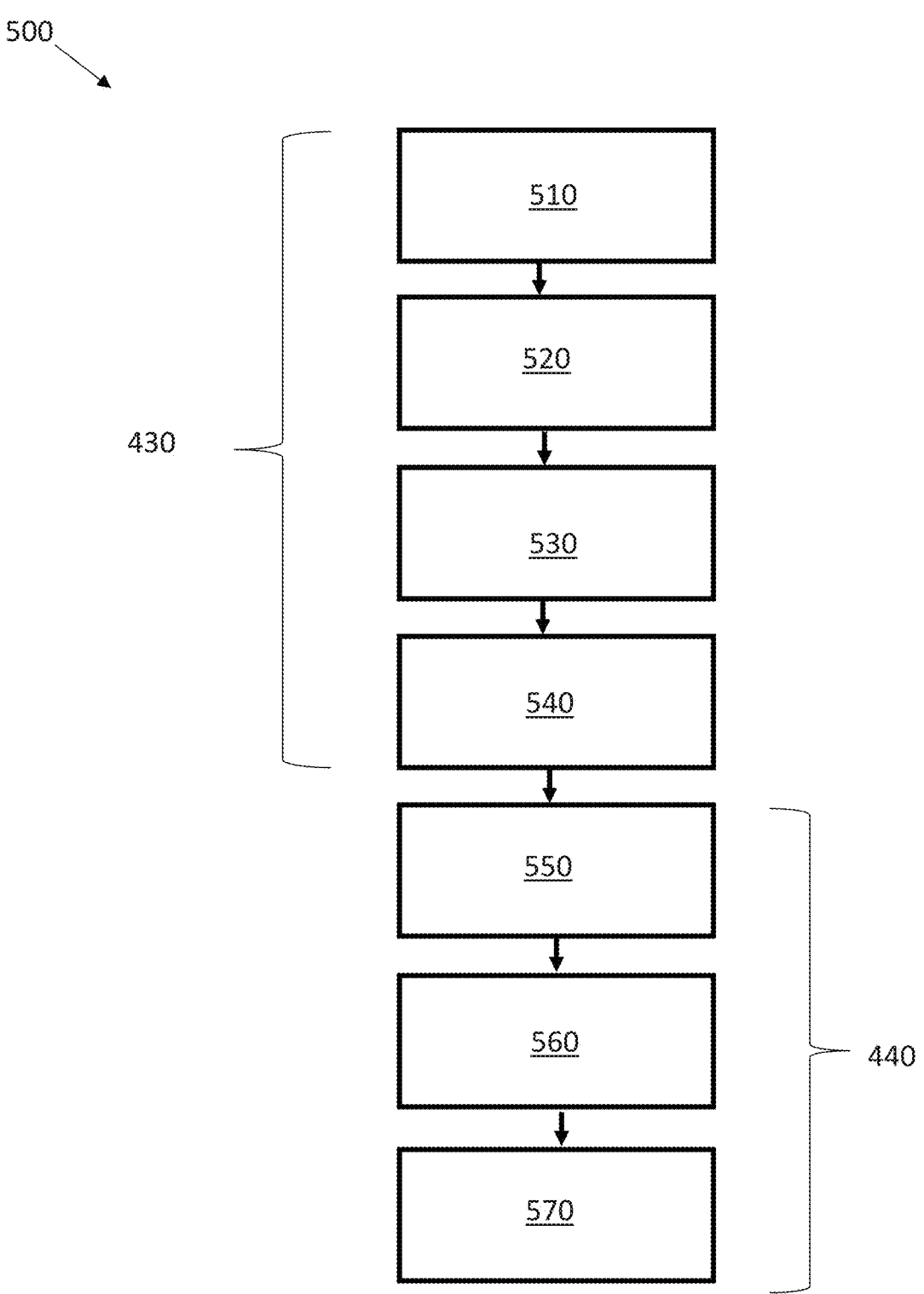
FIG. 16 shows a breakdown of two steps shown in the flowchart of FIG. 15.

FIG. 16 shows a breakdown 500 of the step 430 of commencing production of the ozone and directing the ozone through the ozone transport tube during operation of the internal combustion engine and the step 440 of allowing the ozone to react with deposits in the internal combustion engine for a specific timing interval or specific amount of time. Safety features are verified 510 and the control circuit sends 520 high voltage to the ozone generator. The control module adjusts 530 air flow through the ozone generator. The control module includes a timer control which determines 550 an amount of time ozone is generated by the ozone generator. The control module includes an emergency shutoff for terminating 560 production of the ozone. The control module then provides 570 the user an audio or visual alarm to indicate termination. The control module monitors structural parameters including integrity of each component of the ozone generator.

Figure 17:
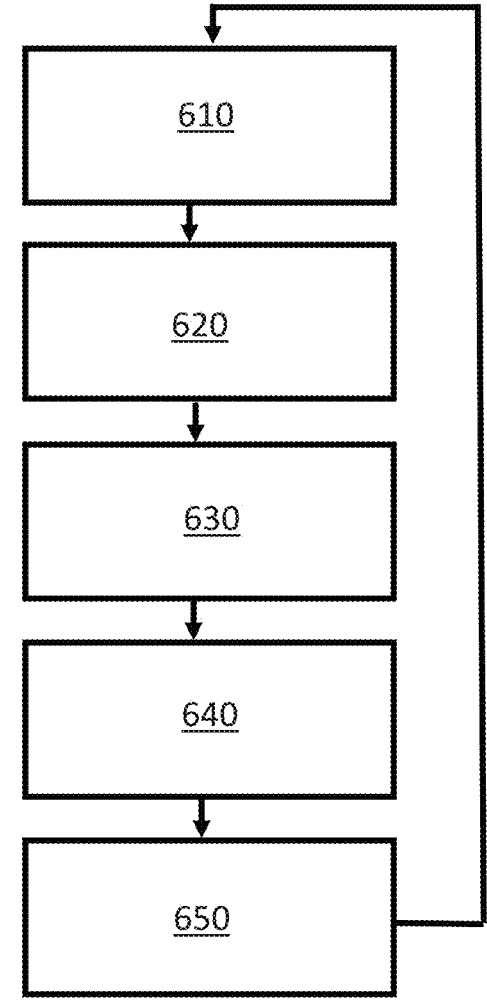
FIG. 17 shows a further breakdown of steps shown in the flowchart of FIG. 16.

FIG. 17 is a flowchart 600 showing selection of voltage applied to the ozone generator including a first step 610 where feedback information controls 620 the voltage output, controls 630 frequency output, or controls 620, 630 voltage and frequency of the power supply in order to control the amount of ozone delivered to the internal combustion engine. As the speed or power output of the engine increases 640, the power circuit self-adjusts 650 to provide more ozone to the engine since more oxidation of the fuel is necessary. Inversely, as the speed of the engine or the power output decreases, the feedback information is sent to the power supply in order to reduce the generation of ozone. This will prevent over generation of ozone.

Figure 18:
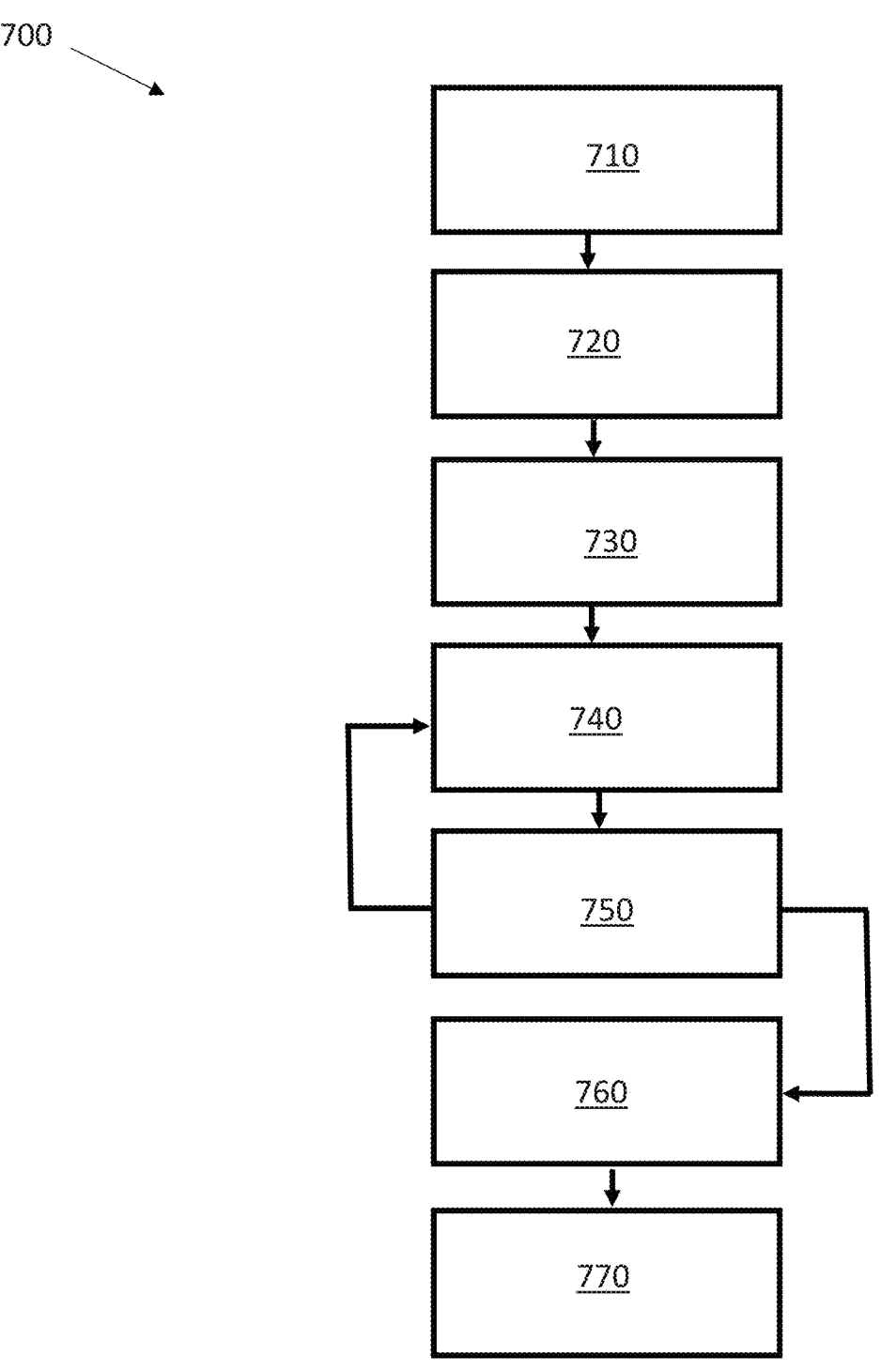
FIG. 18 shows a further breakdown of steps shown in the flowchart of FIG. 15.

FIG. 18 is a flowchart 700 showing a method of using ozone for maintaining an internal combustion engine. The method uses ozone for maintaining an internal combustion engine using the system described above. The method includes a step 710 of connecting the containment shell to an air intake of the internal combustion engine, a step 720 of ensuring the internal combustion engine is running and a step 730 of commencing production of the ozone and a step 740 of directing ozone into the air intake of the internal combustion engine. The method 700 includes the step 750 of allowing the ozone to react with deposits in the internal combustion engine including timing feedback of providing timing intervals of ozone production based on engine performance feedback.

FIG. 19 is a flowchart 800 showing a method of using ozone for maintaining an internal combustion engine. The method uses ozone for maintaining an internal combustion engine using the system described above. The method includes a step 810 of connecting the containment shell to an air intake of the internal combustion engine, a step 830 of commencing production of the ozone and a step 840 of directing ozone into the air intake of the internal combustion engine whereby the ozone reacts with deposits in the internal combustion engine. The method includes providing timing intervals of ozone production based on AI feedback through an AI database system trained on vehicle manufacturing data and system feedback. The step 850 of terminating production of ozone is based on the system making the decision that the engine maintenance should be terminated.

In some embodiments the method or methods described above may be executed or carried out by a computing system including a tangible computer-readable storage medium, also described herein as a storage machine, that holds machine-readable instructions executable by a logic machine (i.e. a processor or programmable control device) to provide, implement, perform, and/or enact the above-described methods, processes, and/or tasks. When such methods and processes are implemented, the state of the storage machine may be changed to hold different data. For example, the storage machine may include memory devices such as various hard disk drives, CD, or DVD devices. The logic machine may execute machine-readable instructions via one or more physical information and/or logic processing devices. For example, the logic machine may be configured to execute instructions to perform tasks for a computer program. The logic machine may include one or more processors to execute the machine-readable instructions. The computing system may include a display subsystem to display a graphical user interface (GUI) or any visual element of the methods or processes described above. For example, the display subsystem, storage machine, and logic machine may be integrated such that the above method may be executed while visual elements of the disclosed system and/or method are displayed on a display screen for user consumption. The computing system may include an input subsystem that receives user input. The input subsystem may be configured to connect to and receive input from devices such as a mouse, keyboard, or gaming controller. For example, a user input may indicate a request that certain task is to be executed by the computing system, such as requesting the computing system to display any of the above-described information, or requesting that the user input updates or modifies existing stored information for processing. A communication subsystem may allow the methods described above to be executed or provided over a computer network. For example, the communication subsystem may be configured to enable the computing system to communicate with a plurality of personal computing devices. The communication subsystem may include wired and/or wireless communication devices to facilitate networked communication. The described methods or processes may be executed, provided, or implemented for a user or one or more computing devices via a computer-program product such as via an application programming interface (API).

Since many modifications, variations, and changes in detail can be made to the described embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

In addition, the present invention has been described with reference to embodiments, it should be noted and understood that various modifications and variations can be crafted by those skilled in the art without departing from the scope and spirit of the invention. Accordingly, the foregoing disclosure should be interpreted as illustrative only and is not to be interpreted in a limiting sense. Further it is intended that any other embodiments of the present invention that result from any changes in application or method of use or operation, method of manufacture, shape, size, or materials which are not specified within the detailed written description or illustrations contained herein are considered within the scope of the present invention.

Insofar as the description above and the accompanying drawings disclose any additional subject matter that is not within the scope of the claims below, the inventions are not dedicated to the public and the right to file one or more applications to claim such additional inventions is reserved.

Although narrow claims are presented herein, it should be recognized that the scope of this invention is much broader than presented by the claim. It is intended that broader claims will be submitted in an application that claims the benefit of priority from this application.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

Thus, having described the invention, what is claimed is:

1. A system for using ozone for an internal combustion engine, the system comprising:
   an ozone generator comprising:
      a containment shell having a first and second opening for allowing air to flow therethrough;
      first and second concentric cylindrical electrodes disposed inside the containment shell; and
      a high voltage source connected between the first and second concentric cylindrical electrode, the high voltage source capable of producing a voltage differential between the first and second concentric cylindrical electrode sufficient to cause production of ozone;

wherein the ozone generator permits air to flow therethrough wherein a change from oxygen to ozone occurs in the air flowing through the ozone generator;

at least one safety module including at least one ozone sensor for sensing the ozone exterior to the containment shell; and a control module for controlling the voltage differential from the high voltage source;

wherein the control module includes an input from the at least one ozone sensor.

2. The system according to claim 1 wherein controlling the voltage includes controlling amplitude of the voltage or controlling frequency of the voltage or a combination of controlling the frequency and the voltage.

3. A method of using the system according to claim 1 for maintaining an internal combustion engine, the method comprising:

providing the system according to claim 1;

connecting the containment shell to an air intake of the internal combustion engine;

ensuring the internal combustion engine is running;

commencing production of the ozone and directing ozone into the air intake of the internal combustion engine;

allowing the ozone to react with deposits in the internal combustion engine;

providing timing intervals of ozone production based on sensor feedback.

4. A method of using the system according to claim 1 for maintaining an internal combustion engine, the method comprising:

providing the system according to claim 1;

connecting the containment shell to an air intake of the internal combustion engine;

ensuring the internal combustion engine is running;

commencing production of the ozone and directing ozone into the air intake of the internal combustion engine;

allowing the ozone to react with deposits in the internal combustion engine;

providing timing intervals of ozone production based on engine performance feedback.

5. A method of using the system according to claim 1 for maintaining an internal combustion engine, the method comprising:

providing the system according to claim 1;

connecting the containment shell to an air intake of the internal combustion engine;

ensuring the internal combustion engine is running;

commencing production of the ozone and directing ozone into the air intake of the internal combustion engine;

allowing the ozone to react with deposits in the internal combustion engine;

providing timing intervals of ozone production based on AI feedback through an AI database system trained on vehicle manufacturing data and system feedback.

6. A system for using ozone for cleaning of an internal combustion engine, the system comprising:

a case having a case housing and an inner cavity, the case including:

a user control panel having a plurality of user controls, the user control panel disposed on the case housing;

an ozone generator in the inner cavity, the ozone generator including a containment shell having a first and second opening for allowing air to flow therethrough, a first and second concentric cylindrical electrode disposed inside the containment shell and a controllable high voltage source connected between the first and second cylindrical electrode wherein the containment shell permits air to flow therethrough wherein a change from oxygen to ozone occurs in the air flowing through the containment shell;

a blower having a first blower end for intake of air external to the case and a second blower end connected to the containment shell first opening;

a safety module including at least one safety sensor connected thereto;

a control module connected to the user control panel and the safety module, the control module for controlling voltage applied between the first and second concentric cylindrical electrode; and a tube connecter having a first connector end connected to the containment shell second opening and a second connector end disposed on the case housing; and an ozone transport tube having a first tube end sealable to the second tube connector end and a second tube end for connection to the internal combustion engine;

wherein the blower directs the ozone through the tube ozone generator, the tube connector and the ozone transport tube during operation of the internal combustion engine, whereby the ozone reacts with deposits in the internal combustion engine for removal of the deposits.

7. The system according to claim 6 wherein controlling the voltage applied between the first and second concentric cylindrical electrode includes controlling amplitude of the voltage or controlling frequency of the voltage or controlling the amplitude and frequency of the voltage.

8. The system according to claim 6 including a dielectric element disposed between the first and second cylindrical electrode.

9. The system according to claim 6 including an engine monitor module for detecting engine parameters.

10. A method of using ozone for maintaining an internal combustion engine, the method comprising:

providing a maintenance system comprising:

a case having a case housing and an inner cavity, the case including:

a user control panel inside the inner cavity;

an ozone generator inside the inner cavity;

a blower inside the inner cavity, the blower having a first blower end for intake of air external to the case and a second blower end connected to the ozone generator; and a safety module including at least one safety sensor connected thereto;

a control module connected to the ozone generator and the safety module, the control module for controlling a voltage applied to the ozone generator;

a tube connecter having a first connector end connected to the ozone generator and a second connector end disposed on the case housing;

an ozone transport tube having a first tube end sealable to the second tube connector end and a second tube end for connection to the internal combustion engine;

connecting the second tube end of the ozone transport tube to an air intake of the internal combustion engine;

ensuring the internal combustion engine is running;

commencing production of the ozone and directing the
       ozone through the ozone transport tube during opera-
       tion of the internal combustion engine;
    allowing the ozone to react with deposits in the internal
       combustion engine;
    stopping production of the ozone; and
    disconnecting the second tube end of the ozone trans-
       port tube from the air intake of the internal combus-
       tion engine.

11. The method according to claim 10 wherein the control module adjusts air flow through the ozone generator.

12. The method according to claim 10 wherein the control module includes a timer control for determining an amount of time ozone is generated by the ozone generator.

13. The method according to claim 10 wherein the control module includes an emergency shutoff for terminating production of the ozone.

14. The method according to claim 10 wherein the control module monitors structural parameters including integrity of each component of the ozone generator.

\* \* \* \* \*